United States Patent
Taylor

(10) Patent No.: US 7,077,379 B1
(45) Date of Patent: Jul. 18, 2006

(54) FUEL INJECTOR USING TWO PIEZOELECTRIC DEVICES

(75) Inventor: Christopher J. Taylor, Kiel, WI (US)

(73) Assignee: Brunswick Corporation, Lake Forest, IL (US)

( * ) Notice: Subject to any disclaimer, the term of this patent is extended or adjusted under 35 U.S.C. 154(b) by 103 days.

(21) Appl. No.: 10/840,909

(22) Filed: May 7, 2004

(51) Int. Cl.
*F16K 31/02* (2006.01)
*B05B 1/08* (2006.01)
*H02N 2/00* (2006.01)

(52) U.S. Cl. ............................. 251/129.06; 239/102.2; 310/328

(58) Field of Classification Search ........... 251/129.06, 251/129.01; 239/102.1, 102.2, 533.2; 310/328
See application file for complete search history.

(56) References Cited

U.S. PATENT DOCUMENTS

| | | | |
|---|---|---|---|
| 4,437,644 A | 3/1984 | Wilmers | |
| 4,593,658 A | 6/1986 | Moloney | |
| 4,739,929 A | 4/1988 | Brandner et al. | |
| 4,813,601 A | 3/1989 | Schwerdt et al. | |
| 4,927,084 A | 5/1990 | Brandner et al. | |
| 5,094,429 A | 3/1992 | Dostert | |
| 5,203,537 A | 4/1993 | Jacobs et al. | |
| 5,335,861 A * | 8/1994 | Matusaka | 239/533.7 |
| 5,779,149 A * | 7/1998 | Hayes, Jr. | 239/124 |
| 5,816,780 A | 10/1998 | Bishop et al. | |
| 6,042,345 A | 3/2000 | Bishop et al. | |
| 6,240,905 B1 * | 6/2001 | Boecking | 123/498 |
| 6,291,929 B1 | 9/2001 | Heinz et al. | |
| 6,411,009 B1 * | 6/2002 | Jaenker | 310/316.01 |
| 6,644,280 B1 * | 11/2003 | Rodriguez-Amaya et al. | 123/447 |
| 6,725,838 B1 * | 4/2004 | Shafer et al. | 123/446 |
| 6,840,466 B1 * | 1/2005 | Igashira et al. | 239/585.1 |
| 6,928,986 B1 * | 8/2005 | Niethammer et al. | 123/467 |
| 6,930,438 B1 * | 8/2005 | Cramer et al. | 310/328 |
| 2004/0003786 A1 | 1/2004 | Gatecliff et al. | |

OTHER PUBLICATIONS

A Thesis entitled "A Comprehensive Piezoceramic Actuator Review and Its Application to the Design of a Direct-Injection Fuel Injector" by Christohper J. Taylor, Sep. 2002.
"Thunder White Paper", published 2001 by Face International Corporation.
"Application Notes", published 2002 by Face International Corporation.

* cited by examiner

*Primary Examiner*—Justine R. Yu
*Assistant Examiner*—Andrew J Rost
(74) *Attorney, Agent, or Firm*—William D. Lanyi

(57) ABSTRACT

A fuel injector uses two or more individual piezoelectric devices. A first piezoelectric device is used to actuate a valve which allows pressurized fuel to pass from a pressure chamber through an outlet port. The fuel is pressurized by a second piezoelectric device. In certain applications, a return piezoelectric device is arranged in opposing configuration to the first piezoelectric device so that the valve can be positively moved both into its opened and closed positions rather than depending on the return force of a spring.

22 Claims, 4 Drawing Sheets

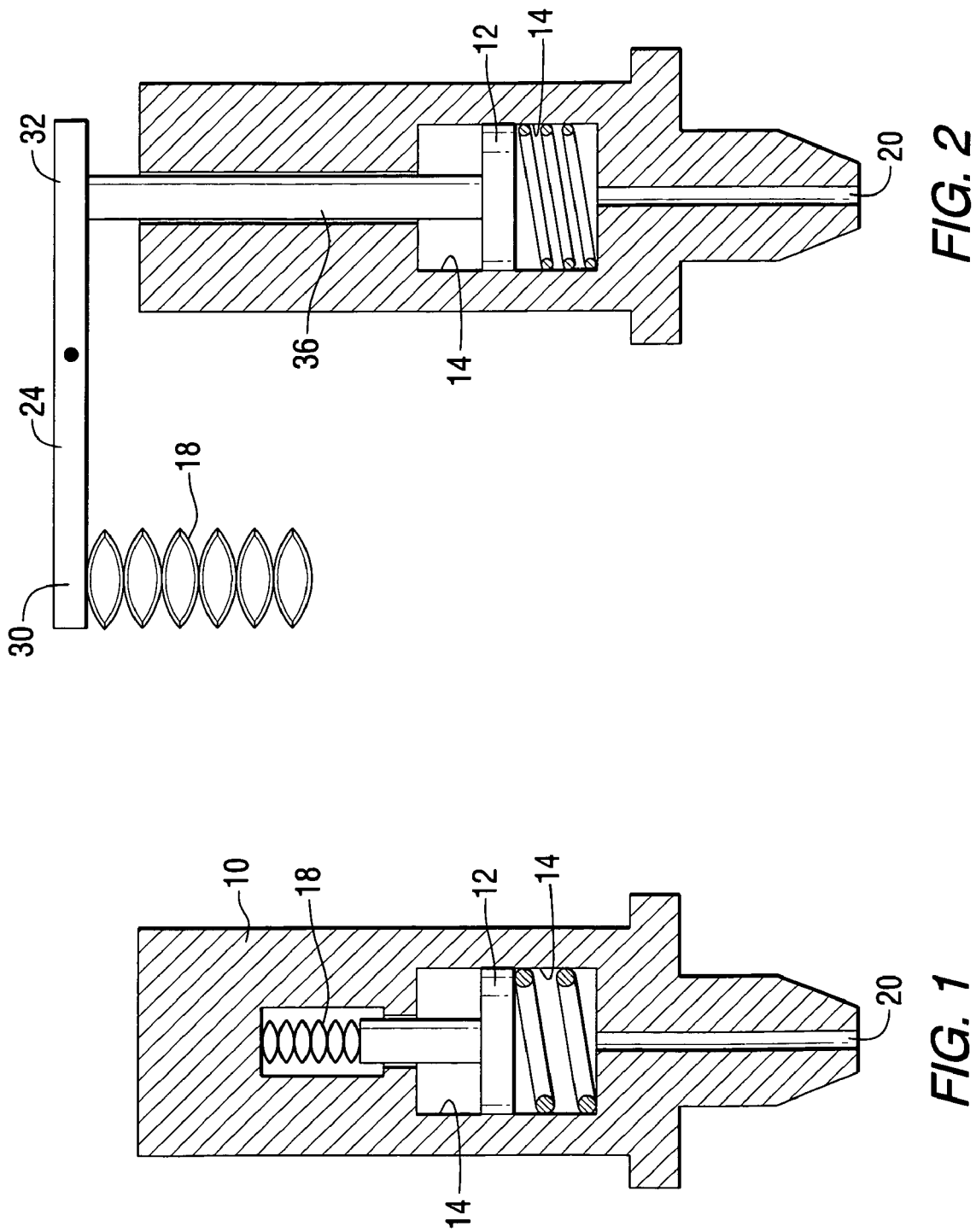

FUEL INJECTOR USING TWO PIEZOELECTRIC DEVICES

BACKGROUND OF THE INVENTION

1. Field of the Invention

The preferred embodiment of the present invention is generally related to a fuel injector and, more particularly, to a fuel injector which uses piezoelectric devices to both pressurize the fuel and to control a valve by which the pressurized fuel is released through an outlet port of the fuel injector.

2. Description of the Prior Art

Many different types of fuel injectors are known to those skilled in the art. Piezoelectric devices, such as those devices using a lead zirconate titanate element are also known to those skilled in the art. In certain applications, piezoceramic elements made of a lead zirconate titanate (PZT) have been used to actuate a movable valve.

U.S. Pat. No. 6,291,929, which issued to Heinz et al. on Sep. 18, 2001, describes a piezoelectric actuator. The invention relates to a piezoelectric actuator, in particular for actuating control valves or injection valves in internal combustion engines of motor vehicles, having a piezoelectric actuator body in the form of a multi-layer laminate of stacked layers of piezoelectric material and metal or electrically conductive layers, acting as electrodes, located between them, in which one of the face ends of the actuator body is fixed to a stationary metal actuator base, and the other face end borders a metal retaining plate that is movable with the actuator stroke.

U.S. Pat. No. 5,094,429, which issued to Dostert on Mar. 10, 1992, describes a valve having a piezoelectric drive. A lever mechanism is provided with a prescribed lever ratio and includes a resilient steel fork for the amplitude transformation of the excursion of a piezoceramic element operating as a piezoelectric actuator, a valve lifter connected at one end to a deflectable end of the steel fork and at the other end to a valve needle of a fuel injector valve.

U.S. patent application Ser. No. 10/462,194, which was filed on Jun. 16, 2003, by Gatecliff et al., describes a piezoelectric valve actuation system. The system is intended for use in an internal combustion engine and includes a piezoelectric driver in the form of a prestressed wafer or strip including a layer of piezoceramic material such as lead zirconate titanate (PZT). The driver has a central portion which includes an aperture for direct engagement with a valve stem so that the valve is moved between open and closed positions directly by the piezoelectric driver. The piezoelectric driver can have end portions which attach to the engine cylinder head proximate the valve location. The piezoelectric actuator is driven by an electronic control module (ECM) providing electrical signals to control valve operation based various engine parameters along with user input.

U.S. Pat. No. 5,816,780, which issued to Bishop et al. on Oct. 6, 1998, describes a piezoelectrically actuated fluid pump. The pump includes a pump housing, a pump chamber, inlet and outlet ports for communicating the pump chamber with the exterior of the pump housing, valves for opening and closing the ports, two prestressed piezoelectric diaphragm members which are self-actuated, and a power source. The diaphragm members include a prestressed piezoelectric element which is durable, inexpensive and lightweight as compared with prior diaphragm pumps of comparable discharge capacity, and is actuated via electrical signals from an outside power source.

U.S. Pat. No. 6,042,345, which issued to Bishop et al. on Mar. 28, 2000, describes a piezoelectrically actuated fluid pump. The diaphragm members of the pump include a prestressed piezoelectric element which is durable and lightweight.

U.S. Pat. No. 4,927,084, which issued to Brandner et al. on May 22, 1990, describes a fuel injection valve. A reciprocable valving element is movable from closed to open positions by a piezoceramic moving unit having at least to flexural resonators in the form of laminated packages of metallic carriers, ceramic layers and foil shaped and/or ring shaped conductors connected to the poles of an energy source in such a way that energization entails deformation of packages in opposite directions, namely the deformed packages have confronting concave or convex sides. This increases the distance which is covered by the valving element in response to energization of the packages.

U.S. Pat. No. 4,437,644, which issued to Wilmers on Mar. 20, 1984, describes an electrically operable valve. The invention relates to valves for use in fuel injection systems for internal combustion engines. The valve has a housing having a valve seat, and receiving a valve body which can be raised from the valve seat in accordance with a variation in dimension of magnetostrictional device or a piezoceramic device caused by a current flow in the device. The valve body is spring loaded in a sense to close the valve and is connected via the device to a movable abutment unit which is so constituted that during the current induced variations in dimension it acts as a stationary abutment or anchorage for that end of the device which is remote from the valve body.

U.S. Pat. No. 4,593,658, which issued to Moloney on Jun. 10, 1986, describes a valve operating mechanism for internal combustion engines and like valved engines. The valve operating mechanism for an internal combustion engine comprises a piezoelectric control device arranged to control the operating movement of an engine valve in accordance with the extension of the control device and control means for controlling the electrical feed to the piezoelectric device in accordance with parameters of the engine operation fed to it.

U.S. Pat. No. 4,739,929, which issued to Brandner et al. on Apr. 26, 1988, describes a fuel injection valve. The valve has a piezoceramic valve body comprising a plurality of superposed ceramic plates each having one conductor layer on each side and voltage leads to the conductor layers. Each ceramic plate is arranged on a carrier plate. Between each unit, consisting of a ceramic plate and a carrier plate, an insulating foil is provided with conductor foils arranged on each side as conductor layers. Each insulating foil comprises two terminal lugs. Each insulating foil, in the region of a terminal lug, is laminated on one side with one conductor foil. The correlated terminal lugs are connected in each case to an electrical contact with the correlated conductor foils.

U.S. Pat. No. 4,813,601, which issued to Schwerdt et al. on Mar. 21, 1989, describes a piezoelectric control valve for controlling fuel injection valves in internal combustion engines. A piezoelectric control valve includes a hydraulic plate compensation element inside the control valve on the one side which automatically compensates for possible changes in length of the reference system as a result of piezoceramic setting actions in the piezoelectric actuator so that, at the same working stroke of the piezoelectric actuator, an identical stroke at the valve is also always ensured. A hydraulic stroke transmission inside the control valve on the other side, provides a valve stroke corresponding to a multiple of the working stroke.

U.S. Pat. No. 5,203,537, which issued to Jacobs et al. on Apr. 20, 1993, describes a piezoceramic valve actuator sandwich assembly and valve incorporating such an assembly. The valve includes a valve actuator sandwich assembly including a piezoceramic bending element flexibly bonded between two metal sheets. Flexible elastomeric sheets are bonded to outer surfaces of the metal sheets, respectively, to form the sandwich assembly. The valve includes a first supporting member which sealingly engages an outer surface of the first elastomeric sheet and a second supporting member which sealingly engages an outer surface of the second elastomeric sheet to flexibly support the valve actuator sandwich assembly between the two supporting members. The valve actuator is engageable with a valve seat to prevent flow through the valve and is deflectable away from the valve seat to allow flow through the valve. The piezoceramic bending element is isolated in the valve actuator sandwich assembly from the flow stream to prevent diffusion of low molecular weight gases through the porous ceramic and to isolate electrically active elements of the bending element from the flow stream.

The patents described above are hereby expressly incorporated by reference in the description of the present invention.

A thesis entitled "A Comprehensive Piezoceramic Actuator Review and Its Application to the Design of a Direct-Injection Fuel Injector", which was presented by Christopher John Taylor in partial fulfillment of the requirements for the Degree Master of Science in the Graduate School of The Ohio State University, describes the technology relating to piezoceramic actuators along with a description and analysis of various characteristics of specific types of piezoceramic actuators.

A document titled "Thunder White Paper" was published in 2001 by the Face International Corporation. That White Paper, which is available on the Internet, describes the technology relating to lead zirconate titanate (PZT) piezoceramic and piezoelectricity along with illustrations showing the construction and advantages of certain devices manufactured and sold by Face International Corporation. Various application notes are also described in detail therein.

An article titled "Application Notes" was published in 2002 by Face International Corporation. This article is available on the Internet and specifically discusses an element, or component, relating to a thin layer Unimorph Ferroelectric Driver and Sensor which is commercially available from Face International Corporation under the name "THUNDER". This paper describes the underlying technology relating to the PZT element and illustrates certain advantageous application techniques relating to using the PZT component in various applications.

It would be advantageous if a fuel injector could be made with a pressurizing portion and an actuation portion both utilizing piezoelectric elements. This type of device could advantageously control the pressurization and injection of fuel in an internal combustion engine. It could provide a reliable and durable structure for such a fuel injector.

SUMMARY OF THE INVENTION

A fuel injection system made in accordance with a preferred embodiment of the present invention comprises an outlet port and a valve which is movable along a path between a first position and a second position, wherein the outlet port is blocked by the valve when the valve is in the first position and wherein the outlet port is unblocked by the valve when the valve is in the second position. A first piezoelectric device is disposed in force transmitting association with the valve to selectively move the valve along the path. The preferred embodiment of the present invention further comprises a pressure chamber and a second piezoelectric device disposed in pressure increasing association with the pressure chamber. Movement of the second piezoelectric device increases the pressure of a fuel within the pressure chamber and movement of the valve under the influence of the first piezoelectric device causes the fuel, which is pressurized within the pressure chamber, to flow from the pressure chamber and through the outlet port.

In a particularly preferred embodiment of the present invention, it further comprises a first resilient member configured to urge the valve toward the first position. The first resilient member can be a spring which provides a force in opposition to the force provided by the first piezoelectric device. In other words, the first piezoelectric device is used to move the valve from the first position toward the second position and the spring, or first resilient member, is used to provide a force in the direction which moves the valve from the second position toward the first position. The first piezoelectric device can be configured to cause the valve to move toward the second position when the first piezoelectric device is activated. The second piezoelectric device can be configured to increase a pressure of the fuel within the pressure chamber during each actuation of the second piezoelectric device. The fuel injection system can be a fuel injector which contains both the first and second piezoelectric devices within a common structure.

In a preferred embodiment of the present invention, both the first and second piezoelectric devices comprise piezoceramic elements which, in turn, comprise lead zirconate titanate components.

In one embodiment of the present invention, a return piezoelectric device is disposed in force transmitting association with a valve to selectively move the valve along the path, wherein the return piezoelectric device is configured to provide a force in a direction which is opposite to the direction of force provided by the first piezoelectric device. As a result, actuation of the first piezoelectric device moves the valve toward the second position and actuation of the return piezoelectric device moves the valve toward the first position.

BRIEF DESCRIPTION OF THE DRAWINGS

The preferred embodiment of the present invention will be more fully and completely understood from a reading of the description of the preferred embodiment in conjunction with the drawings, in which:

FIG. 1 shows a piezoelectric device used to pressurize and inject fuel from a pressurizing cavity through an outlet port;

FIG. 2 is generally similar to FIG. 1 but with a force multiplier lever used to increase the resulting force obtained from the piezoelectric device;

DESCRIPTION OF THE PREFERRED EMBODIMENT

Figure 3:
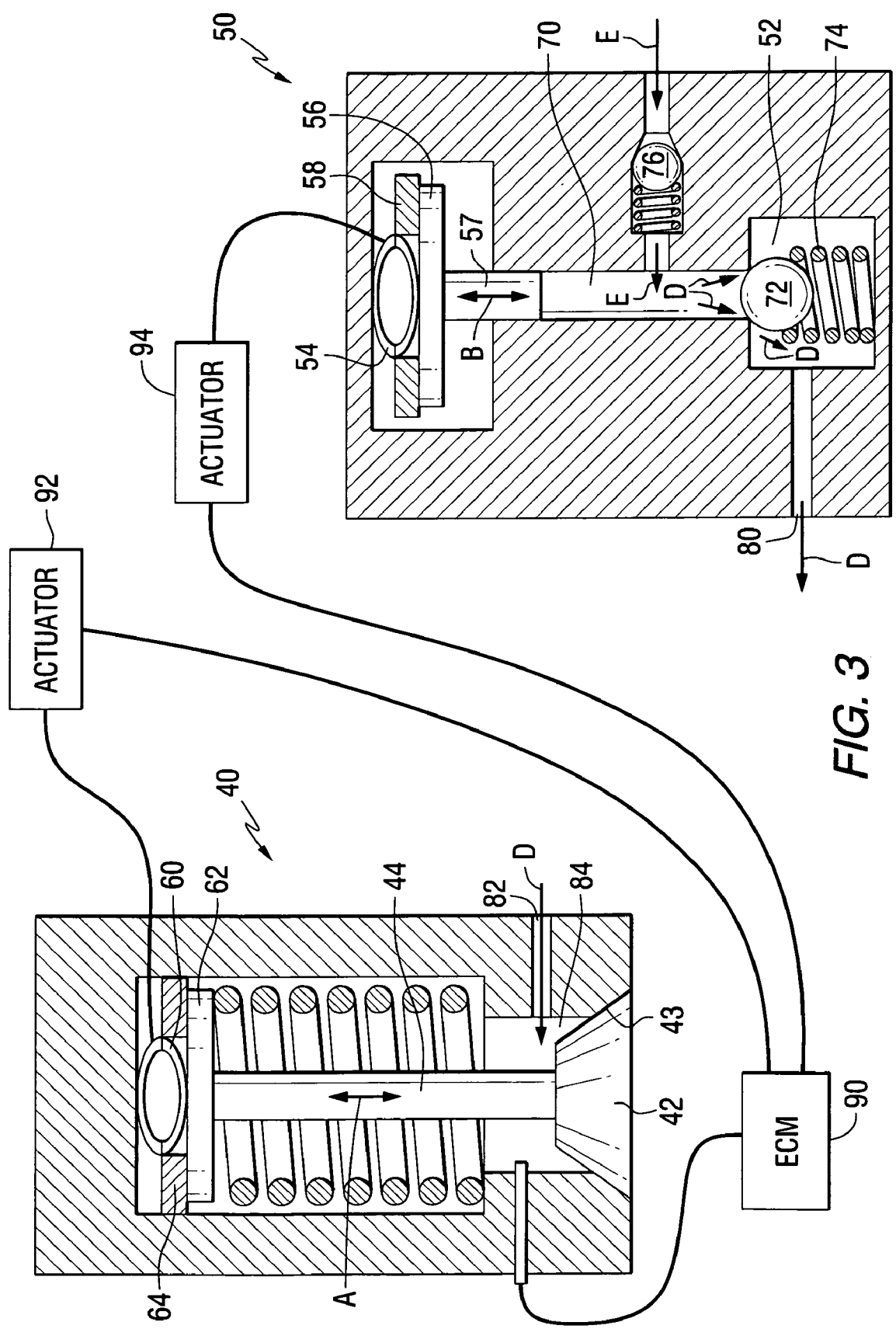
FIG. 3 is a schematic representation of the valve actuation and fuel pressurization portions of a fuel injector made in accordance with the preferred embodiment of the present invention.

Throughout the description of the preferred embodiment of the present invention, like components will be identified by like reference numerals.

FIG. 1 shows a fuel injector 10 that comprises a piston 12 disposed within a cylinder 14. Actuation of a stack 18 of piezoceramic elements causes the piston 12 to move downward in FIG. 1. This pressurizes the fuel in the cylinder 14 below the piston 12 and causes the fuel to flow out of the outlet port 20 of the fuel injector 10.

FIG. 2 is a slight modification of the component shown in FIG. 1. A lever mechanism 24 is provided to magnify the force exerted on the piston 12 in a downward direction. The stack 18 of piezoceramic elements exerts an upward force on a first end 30 of the lever 24. This results in a downward force by the second end 32 of the lever 24 on the shaft 36 which drives the piston 12 downward. This structure shown in FIG. 2 magnifies the force that is exerted on the piston 12 in a downward direction.

FIG. 3 is a simplified schematic representation of a fuel injection system made in accordance with a preferred embodiment of the present invention. It should be understood that the valve actuation portion 40 and the fuel pressurization portion 50 are intended to be disposed within a common structure of a fuel injector. However, for purposes of clarity and to simplify the illustration, the valve actuation portion 40 and the fuel pressurization portion 50 are shown as separate components in FIG. 3. A valve 42 is shaped to be received in a valve seat 43 of the valve actuation portion 40. The valve 42 has a valve stem 44 attached to it. The valve 42 is movable along a path represented by arrow A in FIG. 3. The valve 42 is movable between a first position, shown in FIG. 3, and a second position which is achieved when the valve 42 is moved downwardly from the position shown in FIG. 3. When the valve 42 is in the first position, the outlet port is blocked by the valve 42 as shown. When the valve 42 is in the second position, the outlet port is unblocked. A first piezoelectric device 60 is disposed in force transmitting association with the valve 42 to selectively move the valve 42 along the path A in a downward direction toward its second position. The first piezoelectric device 60 is provided with a platform 62 against which it can exert a downward force. A seal member 64 is also provided. When the first piezoelectric device 60 is actuated, it exerts a downward force on the platform 62 which moves the valve stem 44 downward to move the valve 42 away from the valve seat 43 and unblock the outlet port of the fuel injector.

With reference to the pressurizing portion 50 in FIG. 3, the preferred embodiment of the present invention provides a pressure chamber 52 and a second piezoelectric device 54 which is disposed in pressure increasing association with the pressure chamber 52. When the second piezoelectric device 54 is actuated, it exerts a downward force on the platform 56 to cause the piston 57 to move downward. The piston 57 travels along the path represented by arrow B. A seal 58 is provided.

When the piston 57 moves downward, the pressure within the cavity identified by reference numeral 70 increases. With this increasing pressure, a downward force on ball 72 is provided which moves the ball downwardly against the upward force of spring 74. As a result, fuel can flow from chamber 70 as represented by arrows D. When the second piezoelectric device 54 is deactivated, piston 57 and platform 56 move upwardly and liquid fuel is drawn through a check valve, which comprises ball 76 and an associated spring, as represented by arrows E. Therefore, it can be seen that sequential activation and deactivation of the second piezoelectric device 54 will cause liquid fuel to be pumped in the directions represented by arrows D and E.

With continued reference to FIG. 3, it should be understood that conduits 80 and 82 are intended to be a continuous conduit through which liquid fuel flows as represented by arrows D. This liquid fuel flows into the cavity 84 above the valve 42. Therefore, it should be understood that the pressure chamber of the device shown in FIG. 3, comprises the cavities identified by reference numerals 52, 70, and 84. Within these cavities, fuel is pressurized so that movement of the valve 42 in a downward direction will release the pressurized fuel through the outlet port of the fuel injector.

FIG. 3 also shows an engine control module 90 associated with an actuator 92, or driver, for the first piezoelectric device 60 and another actuator 94, or driver, for the second piezoelectric device 54. These connections allow the engine control module 90 to control the activation and deactivation of the first and second piezoelectric devices, 60 and 54.

Figure 4:
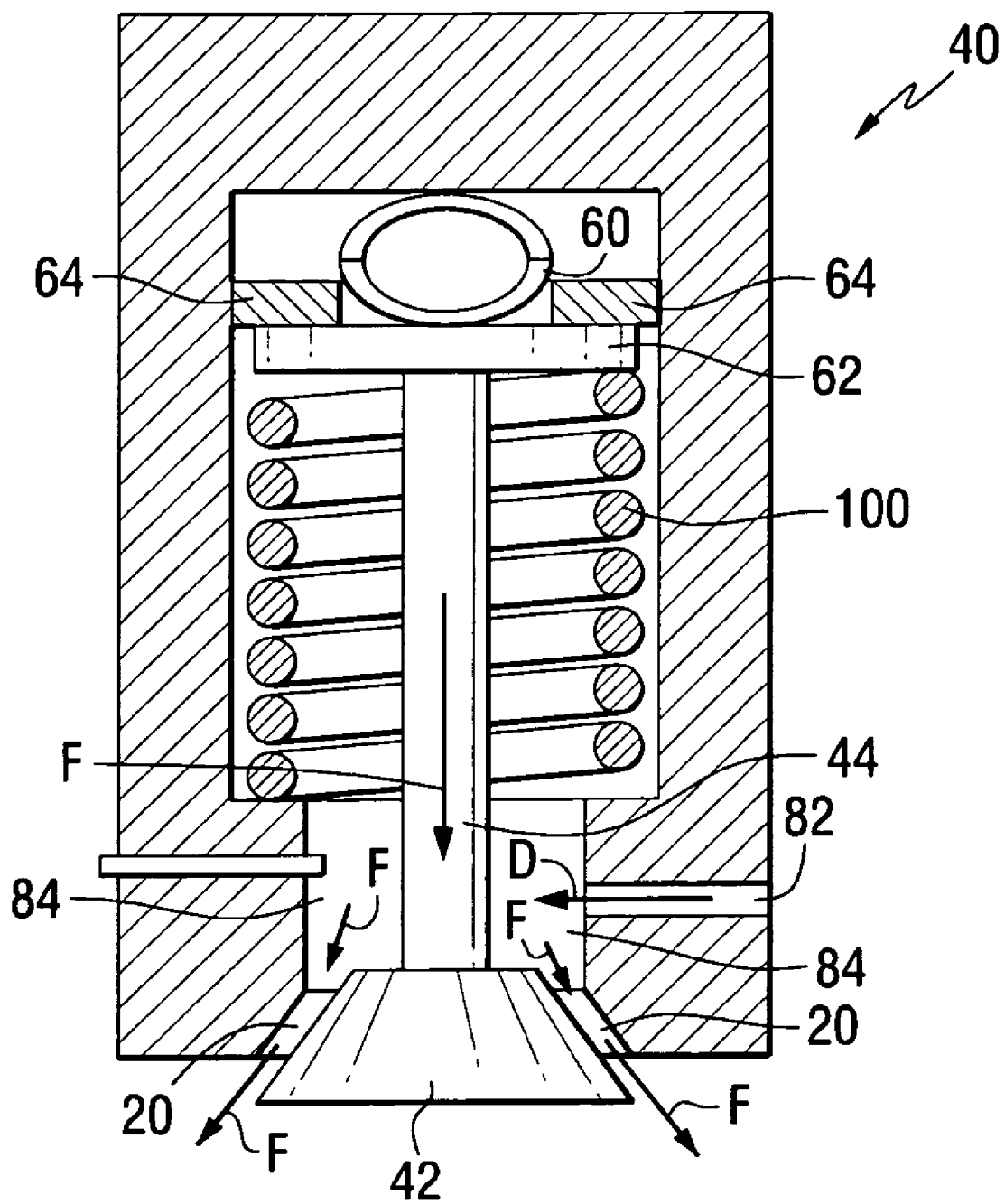
FIG. 4 shows the valve actuation portion in actuated position.

FIG. 4 illustrates the actuation portion 40 of the fuel injector with the valve 42 and its valve stem 44 being pushed downwardly to open the outlet port 20 and allow liquid fuel to pass out of chamber 84. Although not illustrated in FIG. 4, it should be understood that the fuel in chamber 84 was conducted through conduit 82 from conduit 80 and chamber 52 described above in conjunction with FIG. 3. In FIG. 4, the valve 42 is shown in its second position, whereas the valve 42 was shown in its first position in FIG. 3.

With continued reference to FIG. 4, it can been seen that actuation of the first piezoelectric device 60 causes a downward force against pedestal 62 which pushes the valve stem 44 and the valve 42 downwardly against the force of spring 100. When this occurs, and the outlet port 20 is opened as shown in FIG. 4, liquid fuel passes out of chamber 84 as represented by arrows F.

With reference to FIGS. 3 and 4, it should be understood that the actuation of the second piezoelectric device 54 can occur both before and after the actuation of the first piezoelectric device 60, with its subsequent downward movement of valve 42. In other words, with the valve 42 in its first position as shown in FIG. 3, actuation of the second piezoelectric device 54 will raise the pressure of the fuel within the chambers identified by reference numerals 70, 52, and 84. When the first piezoelectric device 60 is actuated and the valve 42 moves downwardly, to its second position shown in FIG. 4, the pressure within chamber 84 immediately drops as the fuel F exits through the outlet port 20. It should be understood that the second piezoelectric device 54 can be repeatedly actuated after the first piezoelectric device 60 is actuated. In other words, with the valve 42 in its second position, as illustrated in FIG. 4, the second piezoelectric device can be actuated to cause subsequent injections of fuel to pass in the directions identified by reference numerals D and F. With the valve 42 in the second position and the outlet port 20 opened, these subsequent actuations of the second piezoelectric device 54 will cause pulsed flows of fuel through the opened outlet port 20. In certain applications, this subsequent pulsing of injected fuel after the initial opening of the outlet port 20 is highly beneficial.

Figure 5:
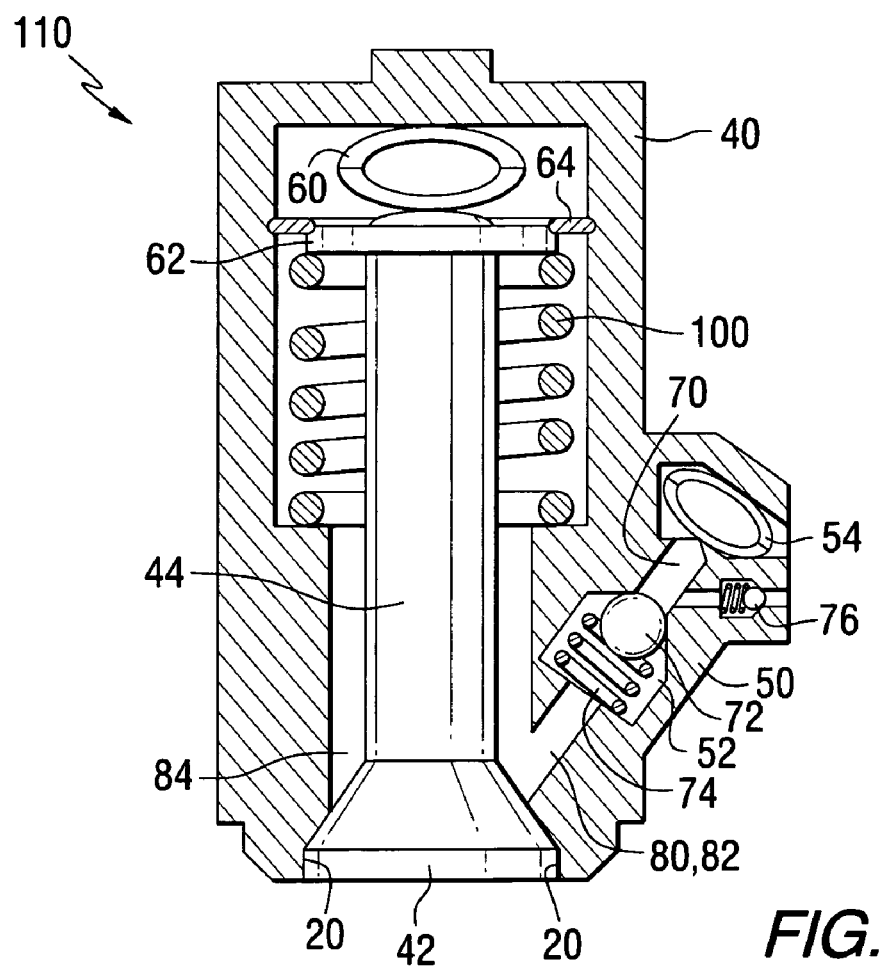
FIG. 5 shows the actuation and pressurization portions of the present invention configured in a common structure.

FIG. 5 shows a fuel injector that incorporates both the valve actuation portion 40 and the fuel pressurization portion 50 in a common integral package. The components identified in FIGS. 3 and 4 and described above are identified in FIG. 5 with the same reference numerals. Fluid conduits 80 and 82 are integral to each other and conduct pressurized fluid from cavity 52 to cavity 84. Actuation of the second piezoelectric device 54 raises the pressure in cavity 52 by sequentially causing fuel to be drawn past ball 76 of a first check valve and then past ball 72 of the second check valve. This raises the pressure in cavity 84 so that actuation of the first piezoelectric device 60 can effectively inject fuel through the outlet port 20 when the valve 42 is moved downwardly as described above.

Figure 6:
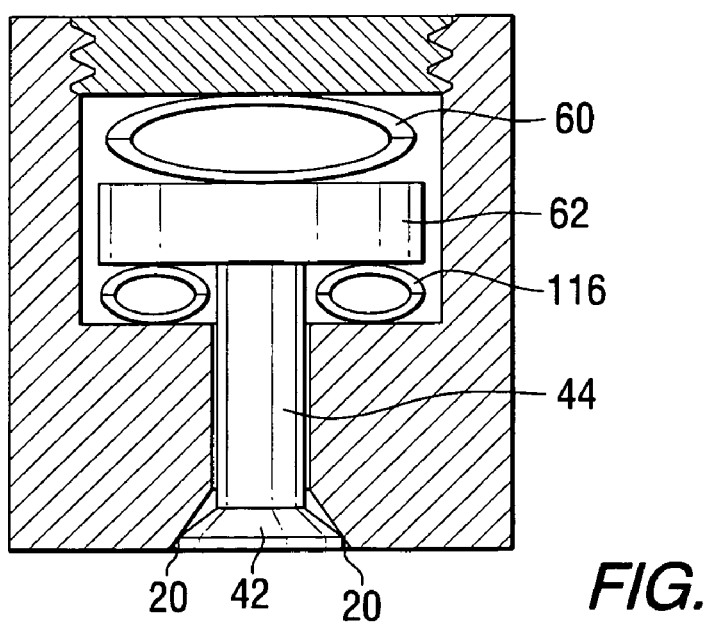
FIG. 6 shows an alternative embodiment of the preferred embodiment of the present invention using a return piezoelectric device.

In certain embodiments of the present invention, it is beneficial to use an additional piezoelectric device 116 as a return piezoelectric device to move the valve 42 back to its first position from its second position rather than depend on the spring 100 described above in conjunction with FIGS. 3–5. This type of embodiment is shown in FIG. 6. This provides piezoelectric devices to force the valve 42 in both directions. The embodiments described above in conjunction with FIGS. 3–5 use a first a piezoelectric device 60 to move the valve 42 from its first position to its second position, but relies on the spring 100 to return the valve 42 from its second position back to its first position. In the embodiment shown in FIG. 6, a return piezoelectric device 116 is used for this purpose instead of the spring. In certain applications, a more positive return to the first position is desirable. By using a return piezoelectric device 116, the return from the second position to the first position of the valve 42 can be much faster than if a spring was relied on for this purpose. Although FIG. 6 is shown in a highly simplified schematic representation, it can be seen that actuation of the return piezoelectric device 116 causes the pedestal 62, the valve stem 44, and the valve 42 to all move upwardly to place the valve 42 in its first position which closes or blocks the outlet port 20.

With continued reference to FIGS. 1–6, it can been seen that the preferred embodiment of the present invention provides a method for injecting fuel for an internal combustion engine which comprises the steps of providing a first piezoelectric device 60 associated in force transmitting relation with a valve 42, providing a second piezoelectric device 54 associated in pressure increasing relation with a pressure chamber 52. The pressure chamber 52 and cavity 84 are provided with an outlet port 20. The method of the preferred embodiment of the present invention further comprises the step of increasing the pressure of a fluid, such as liquid fuel, within the pressure chamber 52 by actuating the second piezoelectric device 54 and moving the valve 42 from a first position, which blocks the outlet port 20, toward a second position which does not block the outlet port 20. This is done by actuating the first piezoelectric device 60. As a result, pressurized fluid flows through the outlet port 20 from the pressure chamber, 52 and 84, when the valve 42 moves away from its first position. The preferred embodiment of the present invention further comprises the step of actuating the second piezoelectric device 54 when the valve is in the second position. This subsequent actuation of the second piezoelectric device 54 when the valve 42 is in the second position is not a requirement in all embodiments but, as described above, can be significantly advantageous by creating subsequent injections of fuel during the period of time when the valve 42 is in its second position and the outlet port 20 is opened. The pressure increasing step performed by the second piezoelectric device 54 can typically be performed when the valve 42 is in its first position so that pressure within the pressure chamber, 52 and 84, is increased. This pressure increasing step can be performed a plurality of times either when the valve 42 is in its first position or after it is moved into its second position. As described above, fluid is drawn into the pressure chamber 52 in response to actuation and subsequent deactivation of the second piezoelectric device 54 as a result of the action of the two check valves which incorporate balls 72 and 76.

The first, second, and return piezoelectric devices described above can be piezoceramic devices such as those which use lead zirconate titanate (PZT) elements.

Although the preferred embodiment of the present invention has been described in particular detail and illustrated to show a preferred embodiment, it should be understood that alternative embodiments are also within its scope.

I claim:

1. A fuel injection system, comprising:
   an outlet port;
   a valve which is movable along a path between a first position and a second position, said outlet port being blocked by said valve when said valve is in said first position, said outlet port being unblocked by said valve when said valve is in said second position;
   a first piezoelectric device disposed in force transmitting association with said valve to selectively move said valve along said path;
   a pressure chamber; and
   a second piezoelectric device disposed in pressure affecting association with said pressure chamber, whereby movement of said second piezoelectric device changes the pressure of a fuel within said pressure chamber by exerting a force on said fuel within said pressure chamber and movement of said valve under the influence of said first piezoelectric device causes said fuel, which is pressurized within said pressure chamber, to flow from said pressure chamber and through said outlet port; wherein said second piezoelectric device is a transducer exerting a force directly on the fuel within the pressurization chamber to create the pressurized fuel.

2. The system of claim 1, further comprising:
   a first resilient member configured to urge said valve toward said first position.

3. The system of claim 1, wherein:
   said first piezoelectric device is configured to cause said valve to move toward said second position when said first piezoelectric device is activated.

4. The system of claim 1, wherein:
   said second piezoelectric device is configured to increase a pressure of said fuel within said pressure chamber during each actuation of said second piezoelectric device.

5. The system of claim 1, wherein:
   said fuel injection system is a fuel injector which contains said first and second piezoelectric devices within a common structure.

6. The system of claim 1, wherein:
   said first piezoelectric device comprises a first piezoceramic element;
   said first piezoceramic element comprises a first lead zirconate titanate component;
   said second piezoelectric device comprises a second piezoceramic element; and
   said second piezoceramic element comprises a second lead zirconate titanate component.

7. The system of claim 1, further comprising:
   a return piezoelectric device disposed in force transmitting association with said valve to selectively move said valve along said path, said return piezoelectric device being configured to provide a force in a direction which is opposite to the direction of force provided by said first piezoelectric device to selectively move said valve along said path.

8. The system of claim 7, wherein:
said first piezoelectric device is configured to move said valve toward said second position and said return piezoelectric device is configured to move said valve toward said first position.

9. A fuel injection system, comprising:
a piezoelectric driven pressurizing chamber;
an outlet port disposed in fluid communication with said piezoelectric driven pressurizing chamber; and
a piezoelectric actuated valve which is movable from a first position in which said piezoelectric actuated valve closes said outlet port and a second position in which said piezoelectric actuated valve opens said outlet port, wherein the piezoceramic driven pressurizing chamber includes a piezoelectric device which is a transducer exerting a force directly on the fuel within the piezoceramic driven pressurizing chamber to create pressurized fuel.

10. The system of claim 9, wherein:
said piezoelectric actuated valve is movable along a path between said first position and said second position.

11. The system of claim 10, wherein:
a first piezoceramic device is disposed in force transmitting association with said piezoelectric actuated valve to selectively move said valve along said path; said piezoelectric device
a second piezoceramic device is disposed in pressure changing association with said piezoelectric driven pressurizing chamber; and
whereby movement of said second piezoceramic device changes the pressure of a fuel within said piezoelectric driven pressurizing chamber by exerting a force on said fuel within said pressurizing chamber and movement of said piezoelectric actuated valve under the influence of said first piezoceramic device causes said fuel, which is pressurized within said piezoelectric driven pressurizing chamber, to flow from said piezoelectric driven pressurizing chamber and through said outlet port.

12. The system of claim 11, further comprising:
a first resilient member configured to urge said piezoelectric actuated valve toward said first position, said first piezoceramic device being configured to cause said piezoelectric actuated valve to move toward said second position when said first piezoceramic device is activated.

13. The system of claim 12, wherein:
said second piezoceramic device is configured to sequentially increase a pressure of said fuel within said piezoelectric driven pressurizing chamber during each of a plurality of actuations of said second piezoceramic device.

14. A method for injecting fuel for an internal combustion engine, comprising the steps of:
providing a first piezoelectric device associated in force transmitting relation with a valve;
providing a second piezoelectric device associated in pressure affecting relation with a pressure chamber, said pressure chamber having an outlet port;
changing the pressure of a fluid within said pressure chamber by actuating said second piezoelectric device and thereby exerting a force on said fluid to change said pressure on said fluid; and
moving said valve from a first position, which blocks said outlet port, toward a second position, which does not block said outlet port, by actuating said first piezoelectric device, whereby pressurized fluid flows through said outlet port from said pressure chamber when said valve moves away from said first position wherein said second piezoelectric device is a transducer exerting a force directly on the fuel within the pressurization chamber to create the pressurized fuel.

15. The method of claim 14, further comprising:
actuating said second piezoelectric device when said valve is in said second position.

16. The method of claim 15, wherein:
said fluid is pressurized and caused to flow through said outlet port while said valve is in said second position.

17. The method of claim 14, wherein:
said pressure increasing step is performed while said valve is in said first position.

18. The method of claim 17, wherein:
said pressure increasing step is performed, while said valve is in said first position, by actuating said second piezoelectric device a plurality of times.

19. The method of claim 14, wherein:
said fluid is drawn into said pressure chamber in response to actuation of said second piezoelectric device.

20. The method of claim 14, wherein:
said fluid is a liquid fuel.

21. The method of claim 14, wherein:
said pressure increasing step is performed, while said valve is in said second position, by actuating said second piezoelectric device a plurality of times.

22. The method of claim 14, wherein:
said first and second piezoelectric devices are both piezoceramic devices.

* * * * *